UNITED STATES PATENT OFFICE.

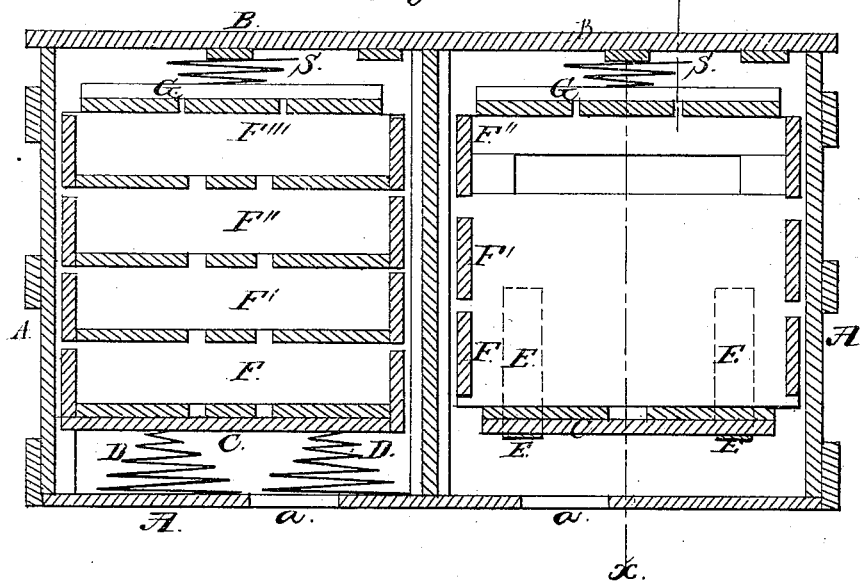
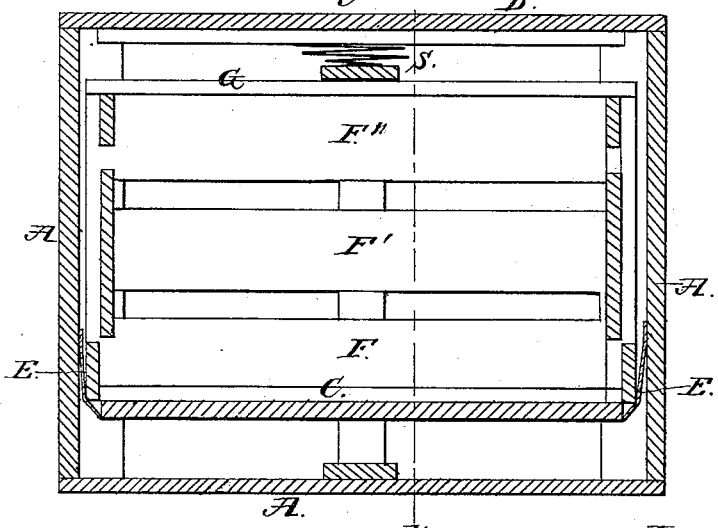

WILLIAM G. GOODALE, OF CENTRALIA, ILLINOIS.

IMPROVED FRUIT-CRATE.

Specification forming part of Letters Patent No. 81,153, dated August 18, 1868.

*To all whom it may concern:*

Be it known that I, WILLIAM G. GOODALE, of Centralia, in the county of Marion and State of Illinois, have invented a new and Improved Fruit-Crate; and I do hereby declare that the following is a full, clear, and exact description of the construction and operation of the same, reference being had to the accompanying drawings, making part of this specification, in which—

Figure 1 is a longitudinal vertical section through line $y\,y$ of Fig. 2. Fig. 2 is a cross-section through line $x\,x$ of Fig. 1.

In this invention the fruit is packed in a crate in well-ventilated boxes, supported upon springs to prevent their bruising it.

The whole crate is very simple, cheap, and durable, and will effectually protect the fruit from injury.

In the drawings, A indicates the walls of the crate, and B its cover, which is hinged at one side and locked or otherwise fastened securely at the other. C is a false or movable bottom, resting upon springs, which may be in the form of spirals, as shown at D D, or simple elastic straps, as seen at E E. Upon the movable bottom or table C rests a box, tray, or drawer, F; upon this box another, F¹, upon this another, F², and so on to any desired extent.

The boxes are made of slats, with open spaces in them for ventilation. The upper box is covered by a loose plate or cover, G, which is pressed down upon it by a spring, S, attached to the lid B.

In Fig. 1 the crate is represented double, in order to exhibit the method of suspending the plate C upon elastic straps, as well as the method of supporting it upon stout springs.

Suitable openings, $a\,a$, may be provided in the sides or bottom of the crate, for the purpose of admitting the air freely to the fruit.

This apparatus has been thoroughly tested, and it has been found that fruit can be transported in it over rough roads with less injury than in any other crate heretofore brought into use.

It is simple in construction, cheap, not liable to get out of order, and will last for years, if used with reasonable care.

Having thus described my invention, what I claim as new, and desire to secure by Letters Patent, is—

The fruit-crate above described, consisting of the box A B, loose plates C G, springs D S, and boxes F F¹ F², constructed and arranged in the manner described.

WM. G. GOODALE.

Witnesses:
J. W. TIMMONS,
J. T. BARNES.